United States Patent
Kanemaru et al.

(10) Patent No.: US 9,964,943 B2
(45) Date of Patent: May 8, 2018

(54) NUMERICAL CONTROLLER OPERATING BASED ON TABULAR DATA

(71) Applicant: FANUC Corporation, Minamitsuru-gun, Yamanashi (JP)

(72) Inventors: Akira Kanemaru, Minamitsuru-gun (JP); Yasushi Takeuchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 230 days.

(21) Appl. No.: 14/960,848

(22) Filed: Dec. 7, 2015

(65) Prior Publication Data
US 2016/0187868 A1 Jun. 30, 2016

(30) Foreign Application Priority Data

Dec. 25, 2014 (JP) ................................. 2014-263098

(51) Int. Cl.
G05B 19/402 (2006.01)
G05B 19/4103 (2006.01)

(52) U.S. Cl.
CPC ............... *G05B 19/4103* (2013.01); *G05B 2219/31475* (2013.01); *G05B 2219/41206* (2013.01)

(58) Field of Classification Search
None
See application file for complete search history.

(56) References Cited

U.S. PATENT DOCUMENTS

| 3,941,987 A * | 3/1976 | Tack, Jr. ............... G05B 19/25 318/571 |
| 4,692,856 A | 9/1987 | Komiya |
| 2003/0191553 A1 | 10/2003 | Isohata |
| 2010/0004760 A1 | 1/2010 | Endo et al. |

(Continued)

FOREIGN PATENT DOCUMENTS

| EP | 0908804 A2 | 4/1999 |
| JP | S59-177604 A | 10/1984 |
| JP | H11-110047 A | 4/1999 |

(Continued)

OTHER PUBLICATIONS

Notification of Reasons for Refusal dated Apr. 4, 2017 in Japanese Patent Application No. 2014-263098 (3 pages) with an English translation (2 pages).

*Primary Examiner* — Carlos Ortiz Rodriguez
(74) *Attorney, Agent, or Firm* — Drinker Biddle & Reath LLP

(57) ABSTRACT

When a command for outputting a movement amount at a specific reference value is included in a command block, a numerical controller which controls a position of a control axis in synchronization with a reference value by using tabular data registers the reference value and the movement amount of the command in a shift table while associating the reference value with the movement amount. Then, when the current reference value reaches the reference value registered in the shift table, the numerical controller superposes the movement amount of the control axis that is associated with the reference value in the shift table on a distributed movement amount to the control axis, and outputs the superposed movement amount as a movement amount of the control axis.

3 Claims, 6 Drawing Sheets

(56) References Cited

U.S. PATENT DOCUMENTS

2014/0058565 A1    2/2014  Shimamura et al.

FOREIGN PATENT DOCUMENTS

| JP | 2003-303005 A | 10/2003 |
|----|---------------|---------|
| JP | 2006-302207 A | 11/2006 |
| JP | 2010-015359 A | 1/2010  |
| JP | 2012-194664 A | 10/2012 |

\* cited by examiner

NUMERICAL CONTROLLER OPERATING BASED ON TABULAR DATA

RELATED APPLICATION DATA

This application claims priority under 35 U.S.C. § 119 and/or § 365 to Japanese Application No. 2014-263098 filed Dec. 25, 2014, the entire contents is incorporated herein by reference.

BACKGROUND OF THE INVENTION

1. Field of the Invention

The present invention relates to a numerical controller which operates in a manner to superpose a plurality of pieces of tabular data.

2. Description of the Related Art

As a method for synchronously driving and controlling respective control axes in synchronization with a motion of a reference axis, an operational function based on tabular data is well known, in which positional information of control axes is preliminarily stored in tabular data, which is provided in a memory or the like, in association with a position of a reference axis, and the respective control axes are operated in synchronization with the reference axis based on the information stored in the tabular data.

In the operational function based on tabular data, tabular data in which a position of each of respective axes or an auxiliary function such as an M code based on a time, a position of an axis or spindle are set is preliminarily stored in a memory (or a storage device connected by a network), and respective axes or the auxiliary function are controlled while sequentially reading the tabular data.

In Japanese Patent Application Laid-Open No. 59-177604 and Japanese Patent Application Laid-Open No. 2003-303005, a path table operational function utilizing the operational function based on tabular data or a numerical controller carrying out a control called "electronic cam control" is disclosed. Accordingly, a movement of a tool free from a machining program is enabled and reduction in machining time and increase in machining precision can be realized.

In prior art operation based on tabular data, reference values described in tabular data and coordinate values, which correspond to the reference values, of an axis or a spindle are set as control points and a movement amount is calculated based on these two control points which are set as a start point and an end point. Specifically, from a reference value and a coordinate value of an axis or a spindle on a control point which is a start point and a reference value and a coordinate value of an axis or a spindle on a control point which is an end point, difference between reference values of two points and a difference between coordinate values of an axis or a spindle of the two points are calculated and a movement amount per reference value unit is calculated.

FIG. 7 illustrates an example of prior art axis control using tabular data.

Tabular data <TIME_TABLE_0001_X> is tabular data which controls an X axis in reference to time. L denotes a reference value (reference time: msec unit) and X denotes a coordinate value (mm unit), which corresponds to the reference value, of the X axis which is a control axis. When a current reference value is 1000 msec, the X axis (control axis) moves between two control points which are a start point on a reference value 1000 msec and a coordinate value 100.0 mm and an end point on a reference value 2000 msec and a coordinate value 200.0 mm.

FIG. 8 is a schematic block diagram illustrating a numerical controller for calculating a movement amount.

A numerical controller 100 notifies command blocks which are sequentially read by a read unit (not illustrated) to a distribution processing unit 130 as two control points (a start point and an end point), and, the distribution processing unit 130 obtains, from a difference in the reference values between these two control points and a difference in the coordinate values between these two control points, a movement amount of an axis per unit reference value and notifies the obtained movement amount to a motor control unit (not illustrated).

In the example of the X axis control using the tabular data <TIME_TABLE_0001_X>, a start point is set on the reference value 1000 msec and the coordinate value 100.0 mm, and an end point is set on the reference value 2000 msec and the coordinate value 200.0 mm, and then the distribution processing unit 130 calculates, from the difference in the reference value (2000 msec−1000 msec=1000 msec) and the difference in the coordinate value (200.0 mm−100.0 mm=100.0 mm), a movement amount of the control axis per unit reference value as 0.1 mm/1 msec.

In such prior art technique, reference values and coordinate values of an axis or a spindle, which are described in the tabular data, are dealt as a start point and an end point for calculating a movement amount. Therefore, in a case where movement amounts are outputted at once at a specific reference value, such as a correcting amount, it is necessary to describe coordinate values taking into account the correcting amount for control points to be a start point and an end point. Further, a movement amount of a control axis is calculated from a difference between two control points which are to be a start point and an end point. Therefore, when a coordinate value of one block is modified, coordinate values of blocks following the modified block need to be relatively shifted as well and accordingly, a modifying amount of tabular data is increased. Further, a control point which is to be an end point of the previous block needs to be added immediately before the correcting amount is outputted, and thus there is such problem that tabular data is increased in capacity.

FIG. 9 illustrates an example of an axis control of tabular data <TIME_TABLE_0002_X> which is obtained by modifying tabular data <TIME_TABLE_0001_X> so that a correcting amount 1.0 mm is outputted at a reference value 1500 msec of tabular data <TIME_TABLE_0001_X>.

As illustrated in FIG. 9, in order to output the correcting amount 1.0 mm at the reference value 1500 msec, a coordinate value 149.0 mm needs to be specified at a reference value 1499 msec which is immediately before the correcting amount is outputted so that a motion until immediately before the correcting amount is outputted is same as a motion of a case where the correcting amount is not outputted. Here, a block ("L1499X149.0") for outputting the correcting amount is added immediately before the correcting amount is outputted, so that such problem arises that tabular data is increased in capacity.

Further, at the reference value 1500 msec at which the correcting amount is outputted, a coordinate value 151.0 mm which is obtained by adding the correcting amount 1.0 mm to a coordinate value 150.0 mm of a case where the correcting amount is not outputted is specified ("L1500X151.0"). Accordingly, a movement amount of 1.0 mm which is equivalent to the correcting amount is outputted. Further, at the reference value 2000 msec, a coordinate value of 201.0 mm which is obtained by adding the correcting amount 1.0 mm to the coordinate value 200.0 mm of a case where the correcting amount is not outputted is specified ("L2000X201.0") so that relative movement amounts from the reference value 1500 msec to the reference value 2000 msec become equivalent to those before the correcting amount is outputted.

In a similar manner, in a block after the correcting amount is outputted, a coordinate value which is obtained by adding accumulation of correcting amounts to the coordinate value of a case where the correcting amount is not outputted needs to be specified. Thus, it is found that a modifying amount is increased when tabular data which is once produced is modified.

SUMMARY OF THE INVENTION

An object of the present invention is to provide a numerical controller which outputs a specified movement amount at a specific reference value at a time, separately from a movement amount which is calculated from control points which are to be a start point and an end point, and shifts a coordinate value by the movement amount after the output.

A numerical controller according to the present invention controls a position of a control axis in synchronization with a reference value by using tabular data for instructing a position of each control axis based on the reference value which is time, an axis position, or a spindle position. The numerical controller includes: a shift table in which the reference value and a movement amount of the control axis are stored in a manner to be associated with each other; a command block read unit which reads a command block from the tabular data; a table analysis unit which, in a case where a command for outputting a movement amount at a specific reference value is included in a command block which is read by the command block read unit, registers a reference value and a movement amount of the command block in the shift table while associating the reference value and the movement amount with each other; an output determination unit which outputs, when the current reference value reaches the reference value registered in the shift table, a movement amount of the control axis that is associated with the reached reference value; a distribution processing unit which generates a movement amount for an axis to be controlled by the tabular data, based on the command block read by the command block read unit, and updates a coordinate value of the control axis based on the movement amount of the control axis which is outputted by the output determination unit; and an output control unit which outputs the movement amount of the control axis that is outputted by the output determination unit, and the movement amount that is generated by the distribution processing unit, as a movement amount of the each control axis.

The shift table may be configured to store a reference value for cancellation and a type of a cancellation method in a manner to be associated with each other. The table analysis unit may be configured to register, when a command for cancelling a movement amount at a specific reference value is included in a command block which is read by the command block read unit, the reference value of the command block and a type of the cancellation command in the shift table in manner to be associated with each other. The output determination unit may be configured to record an accumulated value of movement amounts of the control axis that is outputted up to now, and output the type of the cancellation command and the accumulated value in accordance with the specific reference value for cancellation that is registered in the shift table. And the distribution processing unit may be configured to return a coordinate value of the control axis based on the type of the cancellation command and the accumulated value which are outputted by the output determination unit.

Processing for returning a coordinate value of the control axis that is executed by the distribution processing unit may be either processing for returning the coordinate value based on the accumulated value or processing for following up an actual position of the control axis.

According to the present invention, it is enabled to command a movement amount which is calculated from control points which are to be a start point and an end point and a movement amount which is outputted at a specific reference value by one piece of tabular data in a discriminated manner. Further, a coordinate value is shifted by the movement amount which is outputted at the specific reference value, so that coordinate values in blocks following a modified block do not have to be relatively shifted. Consequently, aimed tabular data can be produced with a small modifying amount without increasing a capacity of tabular data.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
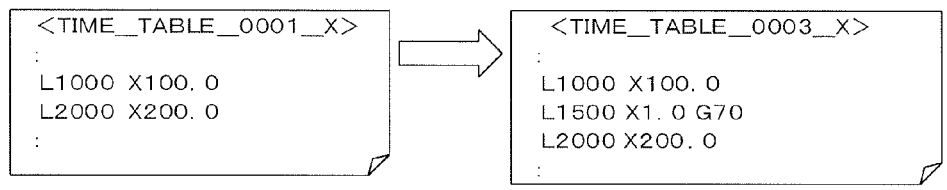
FIG. 1 illustrates a method, according to the present invention, for outputting a specified movement amount at a specific reference value.
Figure 1:
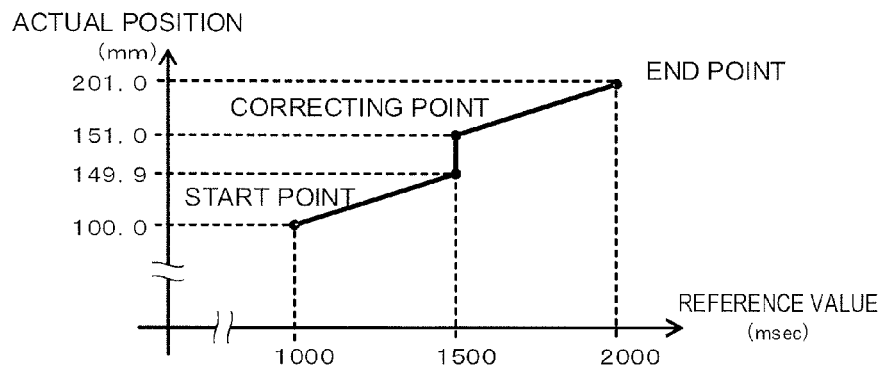

An embodiment of the present invention will be described below with reference to the accompanying drawings. Here, configurations which are identical or similar to those of the prior art technique will be described by using the same reference numerals.

In the present invention, the above-mentioned problems are solved by providing a technique by which a specified movement amount is outputted at a specific reference value at a time, separately from a movement amount which is calculated from control points which are to be a start point and an end point, and a technique by which a coordinate value is shifted by the movement amount after the output.

In the present invention, a command for discriminating control points which are to be a start point and an end point from a point at which a movement amount is outputted at a specific reference value is introduced. FIG. 1 illustrates an example of axis control, in which a numerical controller according to the present invention is used, based on tabular data <TIME_TABLE_0003_X> which is obtained by modifying tabular data <TIME_TABLE_0001_X> so that a correcting amount 1.0 mm is outputted at a reference value 1500 msec of tabular data <TIME_TABLE_0001_X>. Here, G70 is an example of a command for outputting a movement amount at a specific reference value.

Control is performed such that a movement amount is calculated by setting a point on a reference value 1000 msec and a coordinate value X100.0 mm as a start point and setting a point on a reference value 2000 msec and a coordinate value X200.0 mm as an end point, and at a reference value 1500 msec at which G70 command is provided, 1.0 mm is added to the movement amount as a correcting amount. Thus, a block provided with G70 command does not provide a control point which is to be a start point or an end point. Accordingly, a specified movement amount can be outputted at a specific reference value, separately from a movement amount which is calculated from control points which are to be a start point and an end point.

However, when the above-mentioned movement amount which is outputted at a specific reference value is added to a movement amount which is calculated from control points which are to be a start point and an end point, a gap is generated between a coordinate value described in tabular data and an actual position of an axis by the movement amount. In the example of FIG. 1, a coordinate value described in tabular data is 200.0 mm at the reference value 2000 msec whereas an actual position of an axis is on a coordinate value of 201.0 mm. Therefore, the above-mentioned movement amount is managed at a shift table and a coordinate value described in tabular data is shifted by an accumulated value of the movement amounts so that control is performed with the coordinate value described in the tabular data conforming to an actual position of an axis. Accordingly, the movement amount, which is described in the tabular data, between control points does not vary even if the above-mentioned movement amount is outputted at a specific reference value, so that coordinate values after the output of the above-mentioned movement amount do not need to be relatively shifted.

Figure 2:
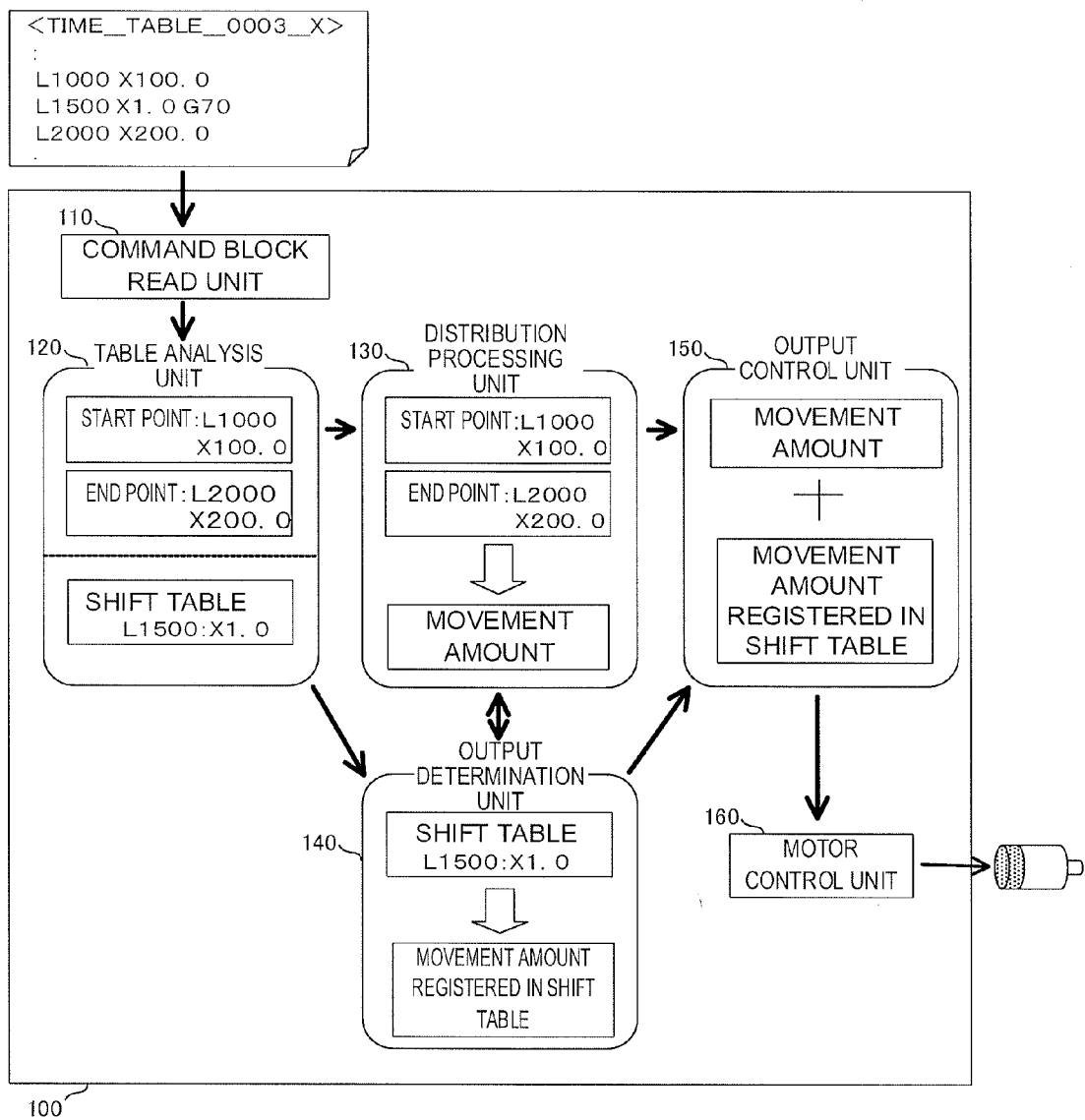
FIG. 2 is a block diagram of a principal part of a numerical controller according to an embodiment of the present invention.

FIG. 2 is a block diagram of a principal part of the numerical controller according to an embodiment of the present invention.

Figure 8:
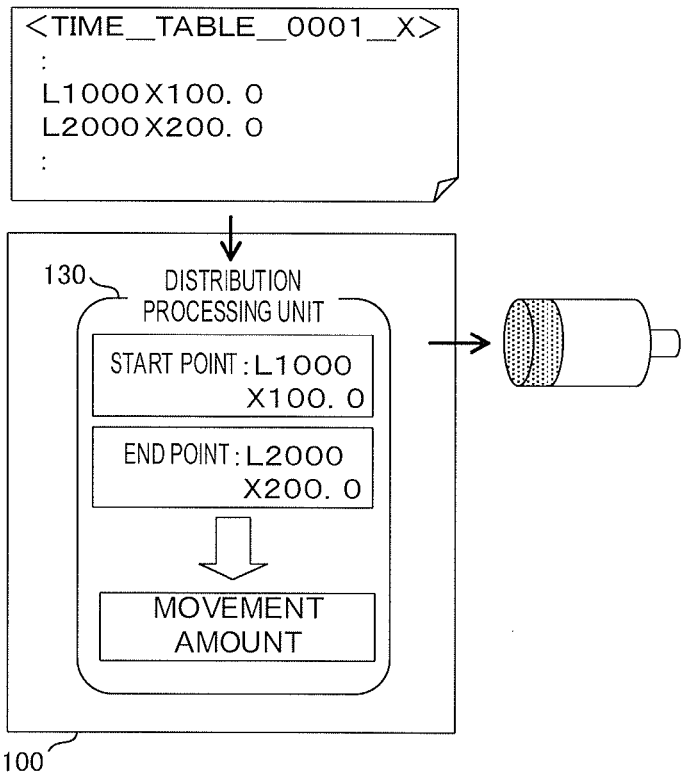
FIG. 8 is a block diagram of a principal part of an example of a numerical controller, according to a prior art technique, for calculating a movement amount of a control axis which is moved by the axis control of FIG. 7.
Figure 9:
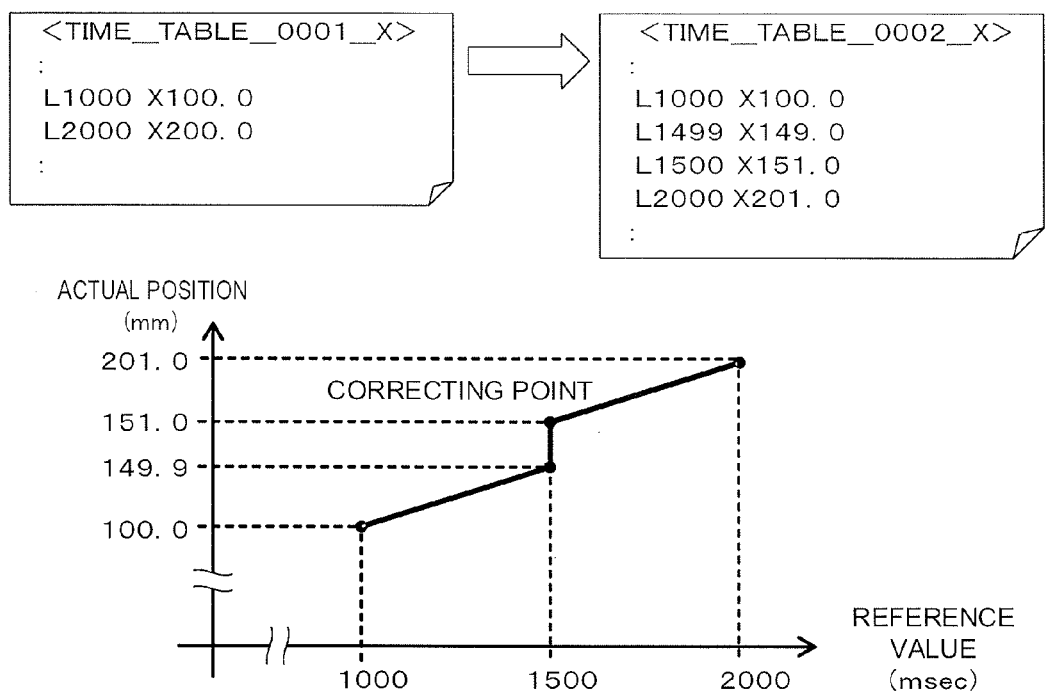
FIG. 9 illustrates problem in another example of prior art axis control using tabular data.

In the present invention, a table analysis unit 120, an output determination unit 140, and an output control unit 150 are provided as new functional means to the numerical controller 100 (refer to FIG. 8) and the following control is performed by each of the functional means.

The table analysis unit 120 determines whether or not a block which is read includes a command for outputting a movement amount at a specific reference value (G70 command in an example of FIG. 2) and requires a command block read unit 110 of reading until a block which does not include such command (G70 command) comes. When the table analysis unit 120 reads out a block which includes the G70 command, the table analysis unit 120 registers a reference value and a movement amount of the block in a shift table. When a block which does not include the G70 command is read, the table analysis unit 120 notifies a distribution processing unit 130 of a start point (L1000 X100.0 as a current position) and an end point (L2000 X200.0) which are to be control points. At the same time, the table analysis unit 120 notifies the output determination unit 140 of an updated shift table.

The output determination unit 140 refers to the reference value and determines whether or not the current reference value reaches the reference value registered in the shift table. When determined that the current reference value reaches the reference value, the output determination unit 140 notifies each of the output control unit 150 and the distribution processing unit 130 of a movement amount corresponding to the above-mentioned reference value.

Here, the distribution processing unit 130 shifts a coordinate value described in the tabular data by the movement amount which is notified from the output determination unit 140 so as to maintain consistency between the coordinate value described in the tabular data and an actual position of an axis. Then, the distribution processing unit 130 returns a processing result to the output determination unit 140 and the output determination unit 140 confirms that the movement amount registered in the shift table is received and adds this movement amount to movement amounts which have been outputted up to now to store the obtained movement amount as an accumulated value.

Then, the output control unit 150 superposes the movement amount which is notified from the output determination unit 140 on the movement amount which is notified from the distribution processing unit 130 and notifies a motor control unit 160 of the superposed value (accumulated value).

In a case where a shift of a coordinate value is cancelled, the flow of the processing is same as that of the above-described processing. When the table analysis unit 120 determines that a block which is read includes a command for cancelling a shift of a coordinate value, the table analysis unit 120 registers a reference value for cancellation and a type of a cancellation method in the shift table. In accordance with the reference value for cancellation and the type of a cancellation method, the output determination unit 140 notifies each of the distribution processing unit 130 and the output control unit 150 of a type of a cancellation command and an accumulated value of movement amounts which have been shifted up to now. Types of the cancellation method includes a method in which a coordinate value (an end point coordinate value and the like) which is managed by the distribution processing unit 130 is returned to a coordinate value described in tabular data and a method for following up an actual position of an axis.

Figure 3:
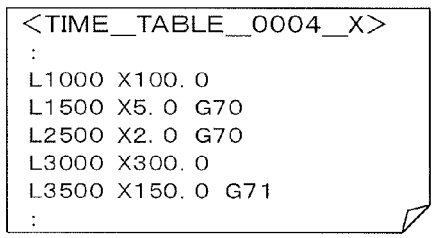
FIG. 3 illustrates an example of axis control which is executed by using the numerical controller of FIG. 2.
Figure 3:
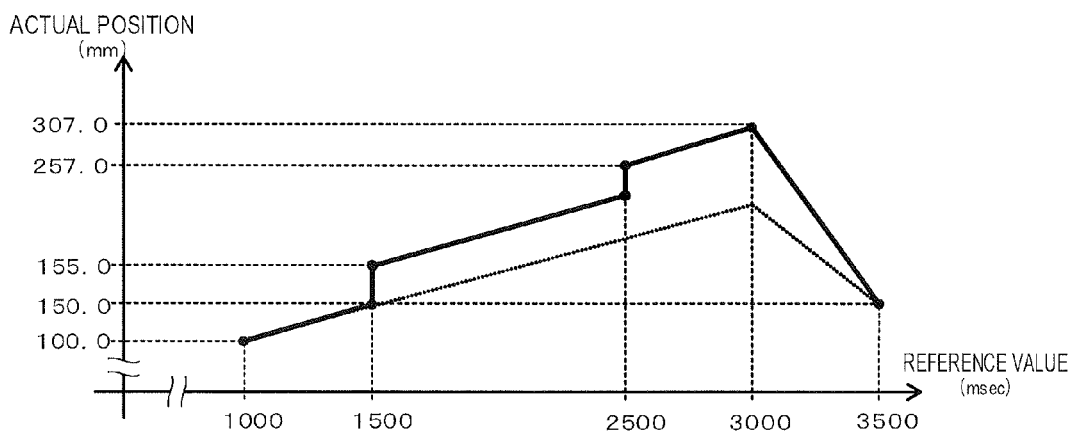

An example of axis control which is executed by using the numerical controller 100 of FIG. 2 is illustrated in FIG. 3.

In tabular data <TIME_TABLE_0004_X> illustrated in FIG. 3, movement is performed between two control points, with a start point set on a reference value 1000 msec and a coordinate value 100.0 mm and an end point set on a reference value 3000 msec and a coordinate value 300.0 mm, and movement amounts of 5.0 mm and 2.0 mm are outputted at reference values 1500 msec and 2500 msec, respectively. At a reference value 3500 msec, a shift of a coordinate value by the movement amounts which are outputted at the reference values 1500 msec and 2500 msec is cancelled. G71 is a command for cancelling a shift of a coordinate value to return an axis position of a control axis to a coordinate value which is described in the tabular data.

Figure 4:
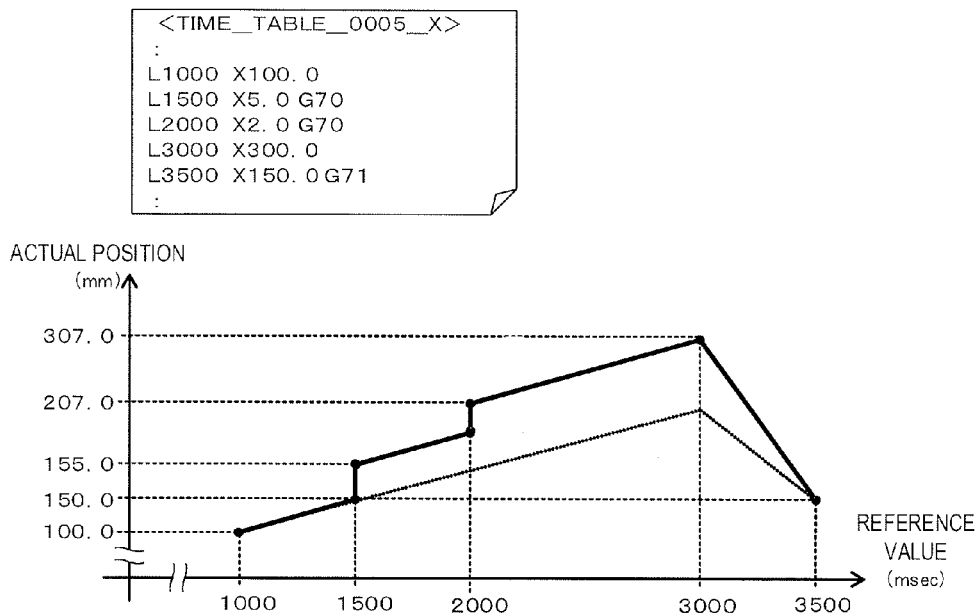
FIG. 4 illustrates a modification of tabular data illustrated in FIG. 3.

In a case where a correcting point of the tabular data illustrated in FIG. 3 is changed from the reference value 2500 msec to a reference value 2000 msec in accordance with change in a machining state, the only thing which has to be done is to change the reference value 2500 msec to the reference value 2000 msec when the technique of the present invention is used. Thus, it is apparent that change of tabular data is easy. Tabular data <TIME_TABLE_0005_X> which is obtained through such modification is illustrated in FIG. 4.

Figure 5:
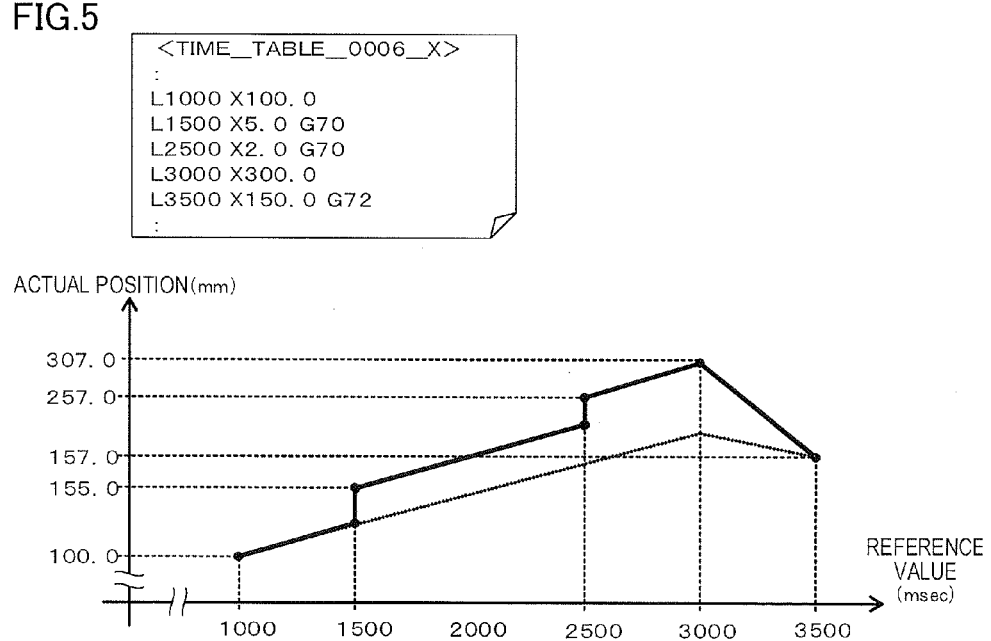
FIG. 5 illustrates another example of axis control which is executed by using the numerical controller of FIG. 2.

Further, another example of axis control which is executed by using the numerical controller 100 of FIG. 2 is illustrated in FIG. 5.

In tabular data <TIME_TABLE_0006_X> illustrated in FIG. 5, a method for performing follow-up is used as another method for cancelling a shift of a coordinate value. Here, G72 is a command for cancelling a shift of a coordinate value to perform follow-up to an axis position of a control axis.

Figure 6:
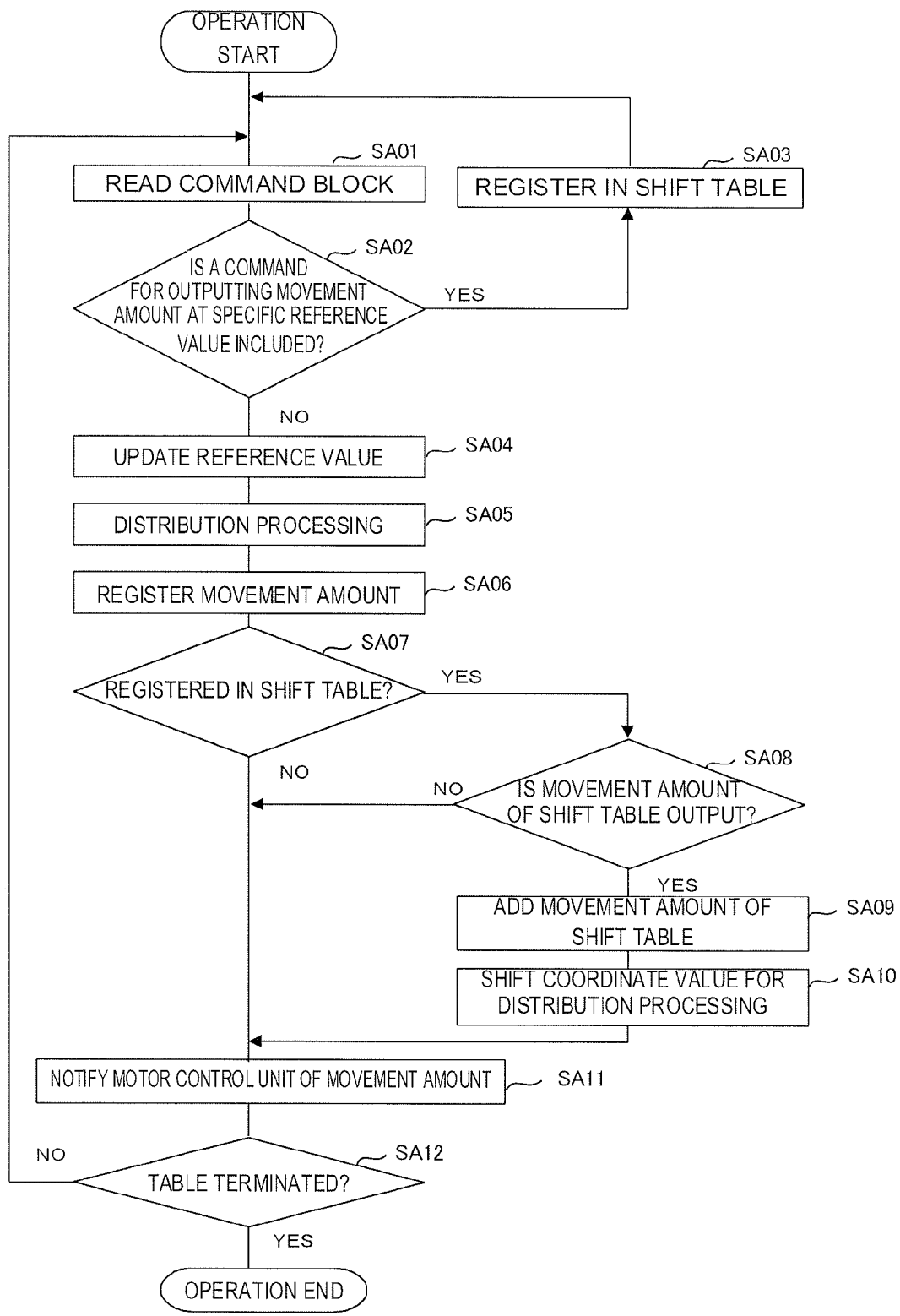
FIG. 6 is a flowchart showing an outline of processing executed on the numerical controller of FIG. 2.
Figure 7:
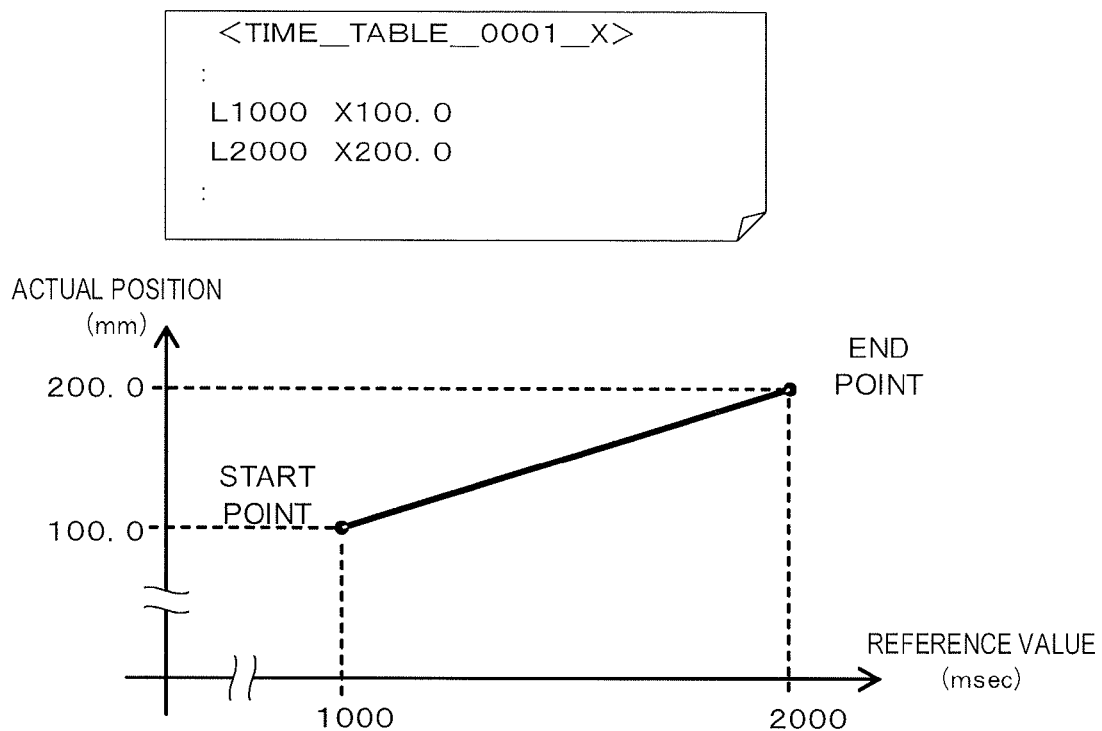
FIG. 7 illustrates an example of prior art axis control using tabular data.

FIG. 6 is a flowchart showing an outline of processing executed on the numerical controller of FIG. 2.

[Step SA01] The command block read unit 110 reads a command block from tabular data which is stored in a memory (not shown).

[Step SA02] The table analysis unit 120 determines whether or not a command (G70 or the like) for outputting a movement amount at a specific reference value is included in the command block which is read in step SA01. When the command for outputting a movement amount at a specific reference value is included, the process proceeds to step SA03. When the command for outputting a movement amount at a specific reference value is not included, the process proceeds to step SA04.

[Step SA03] The table analysis unit 120 acquires, from the command block which is determined in step SA02 to include the command for outputting a movement amount at a specific reference value, a reference value and a movement amount, and additionally registers the reference value and the movement amount in the shift table.

[Step SA04] The distribution processing unit 130 receives the block which is read by the command block read unit 110 and updates a reference value for distribution processing in accordance with a reference such as a time reference, an axis position reference or a spindle position reference which is used in the block.

[Step SA05] The distribution processing unit 130 distributes the movement amount which is instructed in the block into movement amounts to be instructed to a movable part of each of axes for every distribution cycle based on the reference value which is updated in step SA04.

[Step SA06] The movement amounts which are obtained through the distribution processing in step SA05 are outputted to the output control unit 150 and the output control unit 150 registers the movement amounts for respective axes.

[Step SA07] The output determination unit 140 determines whether or not data of reference value and movement amount which has not been processed yet is registered in the shift table. When data of reference value and movement amount which has not been processed yet is registered, the process proceeds to step SA08. When data of reference value and movement amount which has not been processed yet is not registered, the process proceeds to step SA11.

[Step SA08] The output determination unit 140 determines whether or not there is data, among data registered in the shift table, a current reference value of which reaches a reference value of a command for outputting a movement amount. When there is data a current reference value of which reaches a reference value of a command for outputting a movement amount, the process proceeds to step SA09. When there is no data a current reference value of which reaches a reference value of a command for outputting a movement amount, the process proceeds to step SA11.

[Step SA09] The output determination unit 140 outputs a movement amount of data a current reference value of which has reached a reference value of a command for outputting a movement amount, to the output control unit 150.

[Step SA10] The output determination unit 140 outputs, to the distribution processing unit 130, the movement amount of data a current reference value of which has reached a reference value of a command for outputting a movement amount, and the distribution processing unit 130 shifts a coordinate value for distribution processing in accordance with the received movement amount.

[Step SA11] The output control unit 150 notifies the motor control unit 160 of a movement amount which is obtained by superposing the movement amount received from the output determination unit 140 on the movement amount received from the distribution processing unit 130.

[Step SA12] Whether tabular data terminates or not is determined. When the tabular data terminates, the operation processing is ended. When the tabular data does not terminate yet, the process returns to step SA01.

The embodiment of the present invention has been described above. However, the present invention is not limited to the examples of the above-described embodiment, but the present invention can be implemented in other embodiments by adding arbitral alterations.

The invention claimed is:

1. A numerical controller which controls a position of a control axis in synchronization with a reference value by using tabular data for instructing a position of each control axis based on the reference value which is time, an axis position, or a spindle position, comprising:
    a shift table in which the reference value and a movement amount of the control axis are stored in a manner to be associated with each other;
    a command block read unit which reads a command block from the tabular data;
    a table analysis unit which, in a case where a command for outputting a movement amount at a specific reference value is included in a command block which is read by the command block read unit, registers a reference value and a movement amount of the command block in the shift table while associating the reference value and the movement amount with each other;
    an output determination unit which outputs, when the current reference value reaches the reference value registered in the shift table, a movement amount of the control axis that is associated with the reached reference value;
    a distribution processing unit which generates a movement amount for an axis to be controlled by the tabular data, based on the command block read by the command block read unit, and updates a coordinate value of the control axis based on the movement amount of the control axis which is outputted by the output determination unit; and
    an output control unit which superposes the movement amount of the control axis that is outputted by the output determination unit on the movement amount that is generated by the distribution processing unit, and outputs the superposed movement amount as a movement amount of the each control axis.

2. The numerical controller according to claim 1, wherein the shift table is configured to store a reference value for cancellation and a type of a cancellation method in a manner to be associated with each other,
    the table analysis unit is configured to register, when a command for cancelling a movement amount at a specific reference value is included in a command block which is read by the command block read unit, the reference value of the command block and a type of the cancellation command in the shift table in manner to be associated with each other, the output determination unit is configured to record an accumulated value of movement amounts of the control axis that is outputted up to now, and output the type of the cancellation command and the accumulated value in accordance with the specific reference value for cancellation that is registered in the shift table, and the distribution processing unit is configured to return a coordinate value of the control axis based on the type of the cancellation command and the accumulated value which are outputted by the output determination unit.

3. The numerical controller according to claim 2, wherein processing for returning a coordinate value of the control axis that is executed by the distribution processing unit is either processing for returning the coordinate value based on the accumulated value or processing for following up an actual position of the control axis.

* * * * *